United States Patent
Buco et al.

(10) Patent No.: US 8,996,521 B2
(45) Date of Patent: *Mar. 31, 2015

(54) DATA CAVEATS FOR DATABASE TABLES

(71) Applicant: International Business Machines Corporation, Armonk, NY (US)

(72) Inventors: Melissa J. Buco, Amawalk, NY (US); Yixin Diao, White Plains, NY (US); David M. Loewenstern, New York, NY (US); Florian Pinel, New York, NY (US); Larisa Shwartz, Scarsdale, NY (US)

(73) Assignee: International Business Machines Corporation, Armonk, NY (US)

(*) Notice: Subject to any disclaimer, the term of this patent is extended or adjusted under 35 U.S.C. 154(b) by 7 days.

This patent is subject to a terminal disclaimer.

(21) Appl. No.: 13/971,447

(22) Filed: Aug. 20, 2013

(65) Prior Publication Data

US 2014/0214828 A1 Jul. 31, 2014

Related U.S. Application Data

(63) Continuation of application No. 13/751,316, filed on Jan. 28, 2013.

(51) Int. Cl.
G06F 17/30 (2006.01)

(52) U.S. Cl.
CPC .... G06F 17/30595 (2013.01); G06F 17/30339 (2013.01)
USPC .................. 707/736; 707/802; 707/E17.045

(58) Field of Classification Search
CPC ................................................ G06F 17/30595
USPC .................................. 707/736, 802, E17.045
See application file for complete search history.

(56) References Cited

U.S. PATENT DOCUMENTS

| 6,094,649 | A | | 7/2000 | Bowen et al. |
| 6,105,043 | A | * | 8/2000 | Francisco et al. ............. 715/234 |
| 6,434,568 | B1 | | 8/2002 | Bowman-Amuah |
| 7,096,226 | B2 | * | 8/2006 | Brock et al. .................. 707/694 |
| 7,155,400 | B1 | * | 12/2006 | Jilk et al. ...................... 705/7.14 |
| 7,231,396 | B2 | * | 6/2007 | Ayachitula et al. ................... 1/1 |

(Continued)

FOREIGN PATENT DOCUMENTS

JP 2006-331189 * 12/2006 ............. G06F 17/30

OTHER PUBLICATIONS

USDA Net Cash Farm Income of Operatsion; http://www.arcgis.com/home/item.htmlid=4a174c93fb94c2ca238d10587a3e60d; (2012) 2 pages.

(Continued)

*Primary Examiner* — Phuong Thao Cao
(74) *Attorney, Agent, or Firm* — Harrington & Smith; Louis J. Percello

(57) ABSTRACT

A method for storing data caveats for databases is described. The method includes storing at least one record in at least one content table in a database. The method includes storing at least one data caveat having a relationship to the content table in at least one record in a caveat table. A data caveat has a relationship to the content table when the data caveat applies to: a record in the content table or the content table in entirety. The method also includes storing, in a memory device, an indication of the relationship. Articles of manufacture are also described.

16 Claims, 3 Drawing Sheets

(56) References Cited

U.S. PATENT DOCUMENTS

| | | | |
|---|---|---|---|
| 7,266,553 B1* | 9/2007 | Anderson et al. | 1/1 |
| 7,774,359 B2* | 8/2010 | Chkodrov et al. | 707/774 |
| 8,041,799 B1* | 10/2011 | Usery et al. | 709/223 |
| 8,069,422 B2 | 11/2011 | Sheshagiri et al. | |
| 8,169,910 B1* | 5/2012 | Kohn et al. | 370/235 |
| 8,321,302 B2* | 11/2012 | Bauer et al. | 705/28 |
| 8,719,233 B2* | 5/2014 | Gandhi et al. | 707/692 |
| 8,731,526 B2* | 5/2014 | Gibson et al. | 455/412.2 |
| 8,799,122 B1* | 8/2014 | Del Favero et al. | 705/35 |
| 2001/0051765 A1* | 12/2001 | Walker et al. | 600/300 |
| 2003/0046676 A1* | 3/2003 | Cheng et al. | 717/173 |
| 2003/0088632 A1* | 5/2003 | Fukunaga et al. | 709/206 |
| 2003/0101385 A1* | 5/2003 | Lee | 714/48 |
| 2003/0151621 A1* | 8/2003 | McEvilly et al. | 345/744 |
| 2003/0196108 A1* | 10/2003 | Kung | 713/200 |
| 2004/0002993 A1* | 1/2004 | Toussaint et al. | 707/104.1 |
| 2004/0078353 A1* | 4/2004 | Brock et al. | 707/1 |
| 2004/0199867 A1* | 10/2004 | Brandenborg | 715/500.1 |
| 2004/0267824 A1* | 12/2004 | Pizzo et al. | 707/200 |
| 2005/0076065 A1* | 4/2005 | Guay et al. | 707/200 |
| 2006/0095413 A1* | 5/2006 | Moffat et al. | 707/3 |
| 2006/0161635 A1* | 7/2006 | Lamkin et al. | 709/217 |
| 2006/0200480 A1* | 9/2006 | Harris et al. | 707/101 |
| 2006/0241959 A1* | 10/2006 | Chkodrov et al. | 705/1 |
| 2006/0282834 A1* | 12/2006 | Cheng et al. | 717/174 |
| 2007/0156566 A1* | 7/2007 | Nash et al. | 705/37 |
| 2007/0180275 A1 | 8/2007 | Metzger et al. | |
| 2007/0288518 A1* | 12/2007 | Crigler et al. | 707/104.1 |
| 2008/0021696 A1* | 1/2008 | Bartelt et al. | 703/27 |
| 2008/0021926 A1* | 1/2008 | Brock et al. | 707/104.1 |
| 2008/0052358 A1* | 2/2008 | Beaven et al. | 709/205 |
| 2008/0071403 A1* | 3/2008 | Conway et al. | 700/97 |
| 2008/0104542 A1 | 5/2008 | Cohen et al. | |
| 2008/0154907 A1* | 6/2008 | Prasad et al. | 707/10 |
| 2008/0162267 A1* | 7/2008 | Wolf | 705/10 |
| 2008/0186166 A1* | 8/2008 | Zhou et al. | 340/539.13 |
| 2008/0215588 A1* | 9/2008 | Mattheisen | 707/9 |
| 2008/0229199 A1* | 9/2008 | Richardson et al. | 715/714 |
| 2008/0284618 A1* | 11/2008 | Fabas et al. | 340/945 |
| 2008/0301763 A1* | 12/2008 | Sasaki et al. | 726/1 |
| 2009/0248681 A1* | 10/2009 | Shibata et al. | 707/5 |
| 2010/0009622 A1* | 1/2010 | Chen | 455/3.01 |
| 2010/0010901 A1* | 1/2010 | Marshall et al. | 705/17 |
| 2010/0082686 A1* | 4/2010 | Waring et al. | 707/785 |
| 2010/0113072 A1* | 5/2010 | Gibson et al. | 455/466 |
| 2010/0161603 A1* | 6/2010 | Caceres | 707/736 |
| 2010/0241651 A1* | 9/2010 | Xiong et al. | 707/769 |
| 2010/0251011 A1* | 9/2010 | Takagi et al. | 714/6 |
| 2010/0256473 A1* | 10/2010 | Asama et al. | 600/365 |
| 2011/0040800 A1* | 2/2011 | Karibe | 707/802 |
| 2011/0136474 A1* | 6/2011 | Ren et al. | 455/412.2 |
| 2011/0145728 A1* | 6/2011 | Bishop | 715/760 |
| 2011/0154399 A1* | 6/2011 | Jin et al. | 725/46 |
| 2011/0161406 A1* | 6/2011 | Kakeda et al. | 709/203 |
| 2011/0213816 A1* | 9/2011 | Doshi et al. | 707/827 |
| 2011/0231431 A1* | 9/2011 | Kamiwada et al. | 707/769 |
| 2011/0247036 A1* | 10/2011 | Adimatyam et al. | 725/40 |
| 2012/0037600 A1* | 2/2012 | Katoh et al. | 219/59.1 |
| 2012/0157125 A1* | 6/2012 | Pitt et al. | 455/456.3 |
| 2012/0158673 A1* | 6/2012 | Beyreis et al. | 707/692 |
| 2012/0259814 A1* | 10/2012 | Sasaki et al. | 707/645 |
| 2012/0317085 A1* | 12/2012 | Green et al. | 707/704 |
| 2013/0036117 A1* | 2/2013 | Fisher et al. | 707/736 |
| 2013/0097688 A1* | 4/2013 | Bradley et al. | 726/9 |
| 2013/0238677 A1* | 9/2013 | Doshi et al. | 707/827 |
| 2013/0339436 A1* | 12/2013 | Gray | 709/204 |
| 2014/0012845 A1* | 1/2014 | Ikeda | 707/736 |
| 2014/0046638 A1* | 2/2014 | Peloski | 703/6 |
| 2014/0055241 A1* | 2/2014 | Higgins | 340/7.5 |
| 2014/0195381 A1* | 7/2014 | Nash et al. | 705/26.61 |

OTHER PUBLICATIONS

UK Solar Systems Data Centre; http://www.ukssdc.ac.uk/wdcc1/ionosondes/ionodata/caveat/sl051.html; (2012) 2 pages.

Embury et al., Incorporating Domain-Specific Information Quality Constraints into Database Queries; ACM Journal Name, vol. V, No. N Month 20YY, pp. 1-29.

* cited by examiner

DATA CAVEATS FOR DATABASE TABLES

CROSS REFERENCE TO RELATED APPLICATION

This is a continuation patent application of copending application Ser. No. 13/751,316 filed Jan. 28, 2013 which is hereby incorporated by reference in its entirety.

TECHNICAL FIELD

The exemplary embodiments relate generally to data storage and, more specifically, relate to storing data caveats for databases.

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Databases may be used to store data. Some metadata, such as data about the structure of the data, may also be stored. However, this type of structural metadata does not provide a full understanding of the data in the database. Metacontent is a type of metadata which provides information about the data content itself. Such metacontent enables future users to appreciate additional aspects of the data, such as the process used to collect the data.

BRIEF SUMMARY

In an exemplary aspect, a method for storing data caveats, that is, warnings or qualifications about the data or use of the data, for database tables is provided. The method includes storing at least one data field in at least one table in a database. The method includes storing at least one data caveat having a relationship to one or more database tables in at least one record in a caveat table. A data caveat has a relationship to one or more database tables when the data caveat applies to: one or more records in one or more database tables in the database. The method also includes storing, in a memory device, an indication of the relationship.

In another exemplary aspect, an article of manufacture for storing data caveats for database tables is provided. The article of manufacture is tangibly embodying computer readable non-transitory instructions which, when implemented, cause a computer to carry out the steps of a method. The method includes storing at least one data field in at least one table one or more database tables. The method includes storing at least one data caveat having a relationship to one or more database tables in at least one record in a caveat table. A data caveat has a relationship to one or more database tables when the data caveat applies to: one or more records in one or more database tables in the database. The method also includes storing, in a memory device, an indication of the relationship.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein.

DETAILED DESCRIPTION

Figure 1:
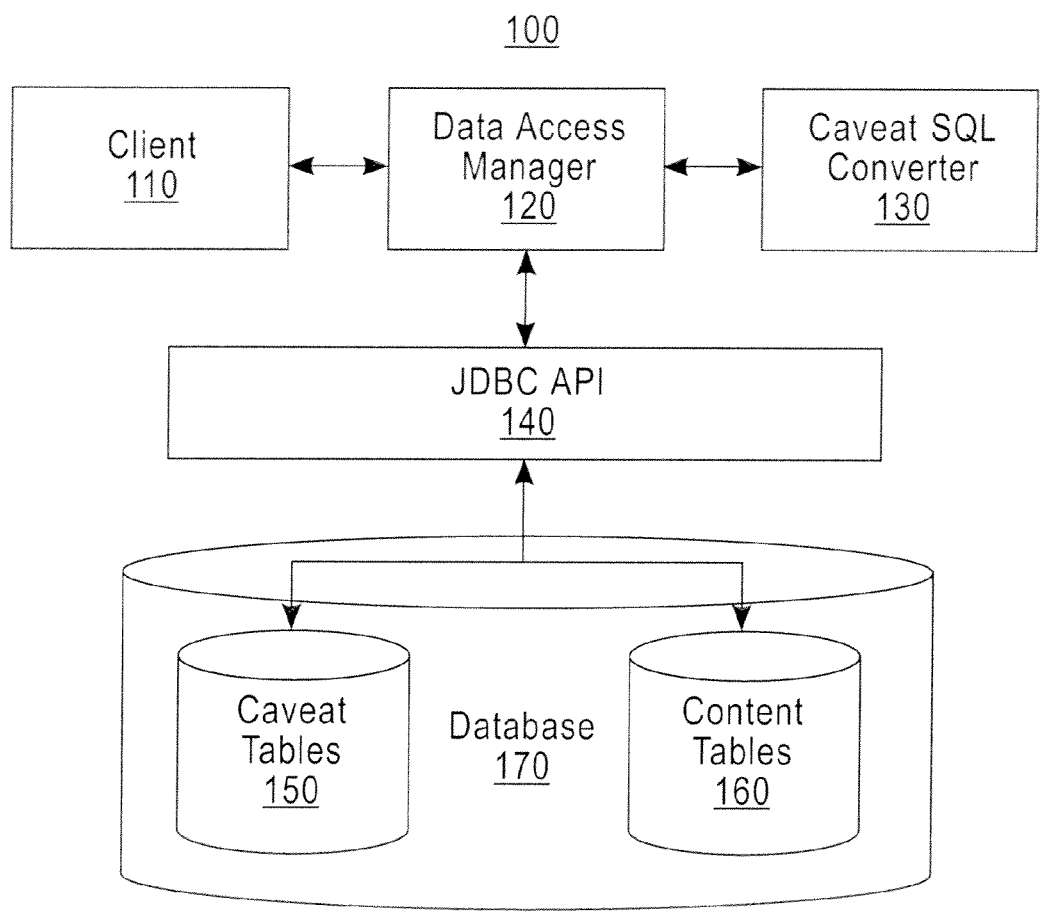
FIG. 1 illustrates a simplified block diagram of software operational components that are suitable for use in practicing various exemplary embodiments.

FIG. 1 illustrates a simplified block diagram of software operational components 100 that are suitable for use in practicing various exemplary embodiments. A client component 110 is usable by users to interact with the data, such as, to store data, access data, query the database, etc. for example. A data access manager 120 receives communications from the client component 110. The data access manager 120 may consult a caveat SQL converter 130 in order to interpret queries.

As a non-limiting example, the data access manager 120 also communicates with a JDBC API 140 in order to access caveat tables 150 and content tables 160. The caveat tables 150 and the content tables 160 may be stored on separate memory devices or on the same memory device.

The data access manager 120 represents an API dealing with data persistence. The data access manager 120 can be a simple wrapper of a JDBC Connection, or a more complex interface that implements Java bean persistence.

Databases, such as 170, may be used to store data and metadata about the structure of the data. In accordance with an exemplary embodiment, information about the instances of the data (such as data about data content or content about content for example) may also be maintained. Such information about content (or metacontent) may include, for example, what was the procedure for collecting the data, did this procedure change over the collection period, were there any constraints imposed during the collection of the data, etc. This sort of metacontent for a set of data will depend on the data itself and will likely change over time. The metacontent captures whatever information is important to ensure that data will be well understood by future users. It can also be used to identify which data was included or excluded for a particular type of analysis.

Various exemplary embodiments enable the data access manager 120 to identify relevant information for an entire table or to explicitly flag records with a multi-bit mask which would indicate which of any number of caveats apply to the entry. Each bit of the mask may be associated with a particular caveat which could be detailed in another table in the database (such as caveat table 150). Such a flag would make it easy for a potential user (such as client 110) to have a clear understanding about the data and reduce the probability of that user misinterpreting the data due to a lack of understanding of the data itself.

Figure 5:
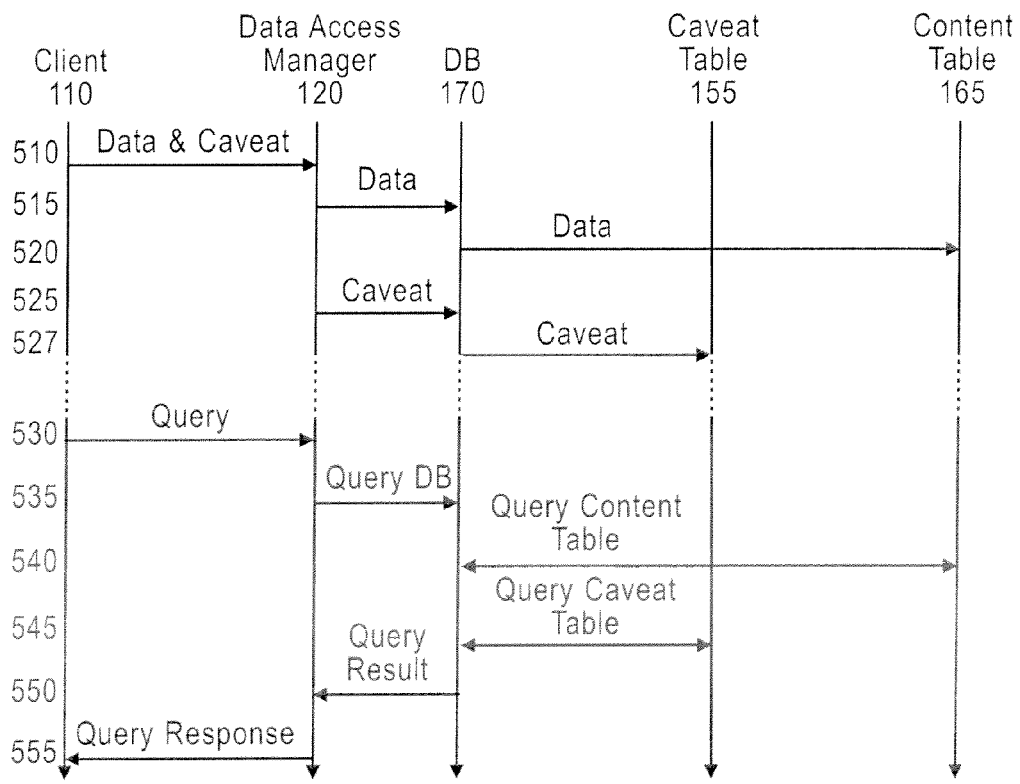
FIG. 5 illustrates a simplified communication diagram in accordance with the first exemplary embodiment.

FIG. 5 illustrates a simplified communication diagram in accordance with a first exemplary embodiment. A client program 110 is shown interacting with a data access manager 120. The data access manager 120 controls access to a database (DB) 170 which then interacts with the content table 165 and caveat table 155. While content table 165 and caveat table 155 are shown as distinct items, content table 165 and caveat table 155 may be stored on the same computer readable device (such as a single hard drive, a RAID drive, etc. for example) or on different computer readable devices.

At point 510, the client 110 sends data and a caveat to the data access manager 120 for storing. As a non-limiting example, the data and caveat are sent in a single message; however, the data may be sent in one message and the caveat may be sent in separate message. The data access manager 120 provides, at point 515, the data to the DB 170 for storage in the content table 165, at point 520, and provides, at point 525, the data (such as a caveat) to the DB 170 for storage in the caveat table 155, at point 527. The data access manager 120 may also add fields to the data and/or caveat in order to indicate a relationship between the data and caveat. As a non-limiting example, the data access manager 120 may add: a field to the content record indicating which caveats in the caveat table 155 apply to that entry and/or a field to the caveat record indicating which content tables the caveat either applies to or have data entries to which the caveat applies.

At some later time, at point 530, the client 110 sends a query to the data access manager 120. The data access manager 120 processes the query (such as by reference to a SQL converter 130 for example). Based on the processed query, the data access manager 120 accesses the DB 170, at point 535. Next, the DB 170 accesses the content table 165, at point 540, and caveat table 155, at point 545, in order to retrieve information sufficient to create the query result which is returned to the data access manager 120, at point 550. At point 555, the data manger 120 provides a query response to the client 110.

As a non-limiting example, Tables 1-3 show two content tables (Table 1 and Table 2) and a related caveat table (Table 3). Table 1 shows a table named "Timing":

TABLE 1

Timing Table

| Unique ID | Entry ID | Activity Type | Activity | Start | End | Effort (mins) | Team | Timing Caveats |
|---|---|---|---|---|---|---|---|---|
| 100 | 12345 | Incident | Disk full | 2011 Oct. 11 09:36 | | 5 | Red | 8b01100000 |
| 101 | 12346 | Maintenance | Patch | 2011 Oct. 11 09:38 | 2011 Oct. 11 09:48 | 10 | Red | 8b01100000 |
| 102 | 12347 | Incident | Out of memory | 2011 Oct. 11 09:42 | | 13 | Purple | 8b01100000 |
| 103 | 12348 | Other | Team Meeting | 2011 Oct. 11 09:45 | | 11 | Green | 8b01100000 |

As shown, each record in the table has a number of fields for various data elements, such as a "Unique ID", an "Entry ID", an "Activity Type", an "Activity", etc. Additionally, each entry includes a "Timing Caveats" field holding an eight bit byte. Each bit corresponds to a caveat in a caveat table.

Table 2 shows another table named "Session":

TABLE 2

Session Table

| Unique ID | Entry ID | Action Type | Action Time | Session Caveats |
|---|---|---|---|---|
| 250 | 12345 | Start | 2011 Oct. 11 09:36:12.0 | 8b10000000 |
| 251 | 12346 | Start | 2011 Oct. 11 09:38:22.0 | 8b10000000 |
| 252 | 12345 | Pause | 2011 Oct. 11 09:41:12.0 | 8b10000000 |
| 253 | 12347 | Start | 2011 Oct. 11 09:42:12.0 | 8b10000000 |
| 254 | 12348 | Start | 2011 Oct. 11 09:45:19.0 | 8b10000000 |
| 255 | 12346 | Finish | 2011 Oct. 11 09:48:22.0 | 8b10000000 |

Similar to Table 1, each record in the table has a number of fields, including an eight bit field corresponding to caveats in a caveat table.

Table 3 shows a caveat table named "Caveats":

TABLE 3

Caveats Table

| Table | Field Name | Bit | Date | Description |
|---|---|---|---|---|
| * | * | | 2011 Apr. 15 | The original intent of collecting this data was . . . The instructions given to the users collecting the data were . . . |
| Timing | * | | 2011 May 01 | COP teams were instructed not to record time spent on passive monitoring |
| Timing | Timing Caveats | 0 | 2011 May 01 | Blue and Yellow teams were combined to form the Green team |
| Timing | Timing Caveats | 1 | 2011 Jun. 21 | Generic activity "Maintain operating system" was removed and the following more specific activities were added . . . |
| Timing | Timing Caveats | 2 | 2011 Oct. 15 | New activity type of Other was added |
| Session | * | | 2011 Apr. 15 | Any activity with last action of Start, Paused, or Resume can be Finished |
| Session | Session Caveats | 0 | 2011 Jul. 30 | Session durations > 240 are no longer permitted by data collection tool |

Similar to the records in Table 1 and Table 2, the records in Table 3 include a number of fields for various data elements. However, in contrast to the data in Table 1 or Table 2, various fields in Table 3 provide information regarding caveats that apply to the content of the data in the other tables (Table 1 and Table 2).

The field "Table" provides an indication of which database table the record is related to. A record relates to a database table when the caveat of the record applies to the table as a whole (table-wide) or to at least one entry in the table. The "Field Name" field provides an indication of a named field in the related database table, for example, a value of "Timing Caveats" indicates the "Timing Caveats" field in the "Timing" table (Table 1). The "Bit" field indicates which bit in the indicated field corresponds to the record. The "Data" and "Description" fields provide information regarding the caveat record, such as, changes in teams which enter data and when such changes occurred, for example. The "Description" field may be used to provide specific information regarding the caveat or bit in the caveat.

A value of "*" in the Table field indicates the caveat applies to all the tables in the database. A value of "*" in the Field Name field indicates the caveat applies to all the fields in the database table or database in the case that the value of Table is also "*". When the Field Name has a value of "*", there is no need to specify a value for the Bit field.

Data caveats can be used to capture information in order that data can be well understood by future users of that data. Caveats may be used to provide users with information regarding how data was captured, which is important when performing analysis of the data and data collection processes. Caveats can also be used to identify which data was included or excluded for a particular type of analysis. This enables subsequent analysis to ensure use of the same data.

Using a caveat table, such as Table 3 for example, various exemplary embodiments provide a method for tagging structured data with unstructured information (such as data caveats). The metacontent may be created for data using a structured technique (such as a metacontent-to-SQL syntax for a direct SQL implementation as a non-limiting example) or the metacontent may be added in a more free form.

In a non-limiting example, each entry in a database table is flagged with a multi-bit mask indicating which caveats apply to the data. Each bit of the mask is associated with a particular caveat detailed in another database table. These caveats may be created at data collection time or added prior to publication of the data. Various caveats may apply table-wide such that the caveat applies to all entries in the table. Such table-wide caveats may be indicated without being part of the multi-bit mask in order to avoid excess repetition (as a non-limiting example, a table-wide caveat may be indicated by being omitted from the multi-bit mask).

By providing accessible fields in the content tables and caveat tables, the data may be seamlessly queried in regards to the caveats and, likewise, the data entries may be queried with a certain set of caveats. For example, a user may request a list of all caveats that apply to a given entry. Such a search may (or may not) omit table-wide caveats based on the user's preferences. In another non-limiting example, a user may wish to see to which records a specific caveat applies.

Figure 2:
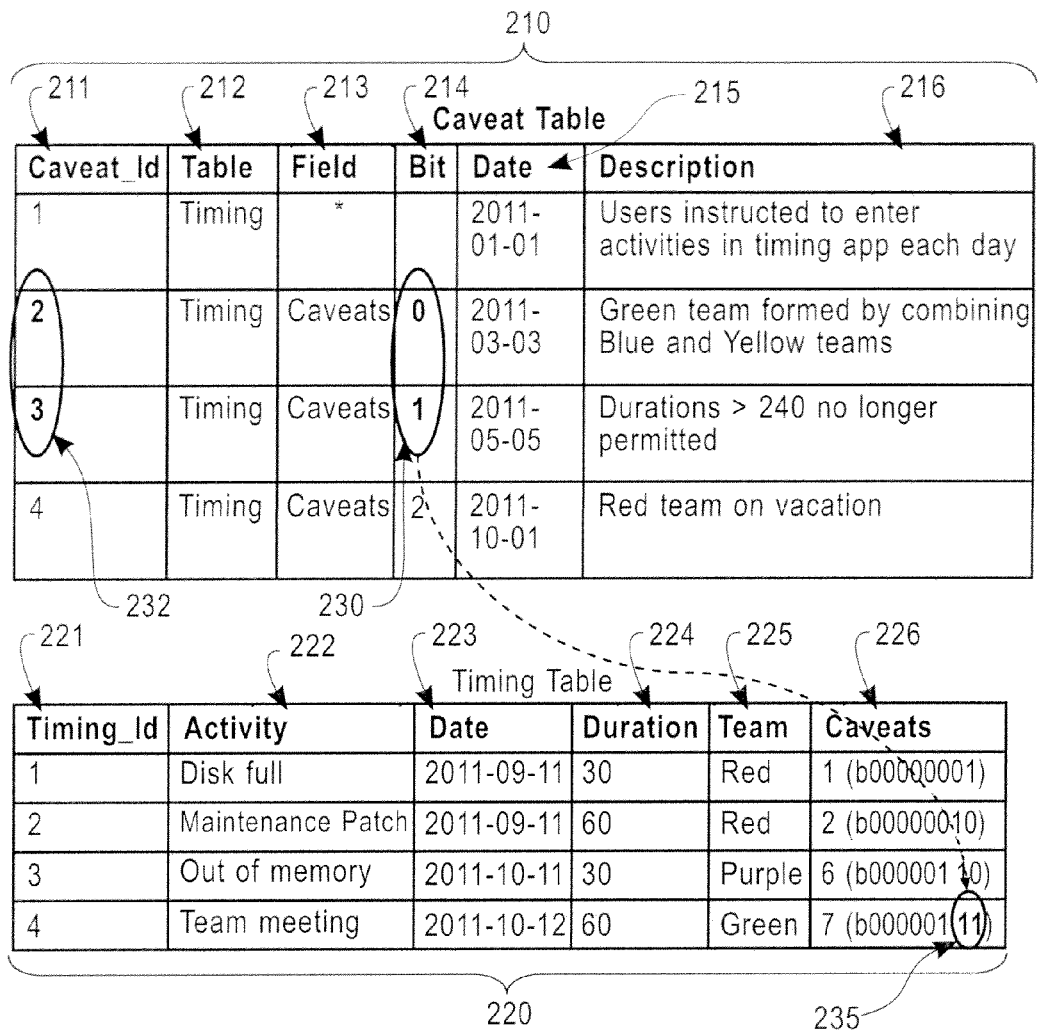
FIG. 2 demonstrates the relationship between a content table and a caveat table in accordance with an exemplary embodiment.

FIG. 2 demonstrates the relationship between a content table 220 and a caveat table 210 in accordance with an exemplary embodiment. The content table 220 is named "Timing" and stores data regarding various activities in entries (shown as rows). As shown, each record in the content table 220 has a field for a "Timing_Id" 221 to identify the record and a field for "Activity" 222 that provides information (the activity) for that record. Additionally, the records include a field for the "Date" 223, a field for the "Duration" 224 and a field for the "Team" 225.

A final field 226 is present that indicates which (if any) caveats in the caveat table 210 apply to that entry. As a non-limiting example, field 226 may include a multi-bit field (such as an 8-bit byte) where each bit corresponds to a specific caveat. In one embodiment, a bit value of 1 indicates that the caveat corresponding to that bit applies to the data entry and a value of 0 indicates that the caveat corresponding to that bit does not apply to the data entry.

The caveat table 210 stores data regarding various caveats that apply to various records in the content table 220 or to the content table 220 in whole (table-wide). Each record in the caveat table 210 has a field for a "Caveat_Id" 211 to identify the record and a field for "Table" 212 indicating to which content table(s) the record relates.

Records in the caveat table 210 also include a field named Field 213 which may be used to distinguish caveats that relate to individual records in the indicated table. The example has a value "Caveats" for this field. A value of "*" for Field 213 indicates that the caveat relates to the content table 220 in whole. For those records which relate to individual records of the content table(s), a field named Bit 214 indicates which bit in field 226 (pointed to by value of Field 213) of the content table 220 indicate whether or not the caveat applies to that record. In a non-limiting example, the value represents the number of bits to the left of the right most bit is used. Such that a value of '0' indicates the right most bit and a value of '2' indicates the third bit to the left (shown with an 'X' in the following byte: 0000 0X00).

The field named Date 215 contains the date at which the caveat took effect. The Field named Description 216 contains a description of the caveat, that is, the information which future consumers of the data should know to properly use the data.

As shown, the content table 220 entry with a "Timing_Id" value of 4 corresponds to a "Team meeting" activity for the Green team on Oct. 12, 2011 which lasted 60 minutes. The caveat field has a value of '7' which corresponds to the byte: 0000 0111. Each bit in the byte can relate to a caveat record in the caveat table 210. In this example, since bits 0, 1 and 2 have values of 1, Caveat-Id records 2, 3 and 4 apply to the entry.

A user may request (from the data access manager 120) information regarding the stored data. Using SQL language as a non-limiting example, the user (via the client 110) may request a list of caveats for the whole table using the following command:

SELECT CAVEATS FOR Timing, which would be converted by the data access manager 120 to:
SELECT*FROM Caveat WHERE Table IN ('Timing'.'*').

The user may also request a list of caveats that apply to a particular record:

SELECT CAVEATS FOR Timing WHERE Timing_Id=1,
which would be converted by the data access manager 120 to:
SELECT Caveats FROM Timing WHERE Timing_Id=1+ SELECT*FROM Caveat WHERE Table IN ('Timing', "*") AND Bit IN (1).

In order to request records that match certain caveats (such as by having the caveat apply to that record), the user may use the command:

SELECT*FROM Timing WITH CAVEATS (2, 3),
which would be converted by the data access manager 120 to:
SELECT * FROM Caveat WHERE Table IN ('Timing', '*') AND Caveat_Id IN (2, 3)+SELECT*FROM Timing WHERE BITAND (Caveats, 3)=3.

In accordance with SQL language (as a non-limiting example), the commands may be written using alternative commands, for example, the following commands would also be acceptable to request records that match certain caveats:

SELECT CAVEATS FOR Timing WHERE Timing_Id=1,
which would be converted by the data access manager 120 to:

SELECT c.* from Caveat c, Timing t WHERE c.Table In ('Timing','.*') AND c.Field='Caveats' AND t.Timing_Id=1 AND BITAND(t.Caveats, POWER(2, c.Bit)) < > 0; and SELECT*FROM Timing WITH CAVEATS (2, 3), which would be converted by the data access manager 120 to:

WITH CaveatMask AS (SELECT SUM(POWER(2, c.Bit)) AS Mask FROM Caveat c WHERE c.Table In ('Timing','*') AND c.Field='Caveats' AND c.Caveat_Id IN (2, 3)) SELECT t.* FROM Timing t,CaveatMask cm WHERE BITAND (t.Caveats, cm.Mask)=cm.Mask.

In accordance with SQL language commands (as a non-limiting examples) may also be used to update entries:

UPDATE Timing SET CAVEATS=3, which would be converted by the data access manager 120 to:

UPDATE Timing SET Caveats=3.

and to set default caveats:

ALTER Timing SET DEFAULT CAVEATS=3, which would be converted by the data access manager 120 to:

ALTER TABLE Timing ALTER COLUMN Caveats SET WITH DEFAULT 3.

As a non-limiting example, data access manager 120 may receive an SQL command: "SELECT*FROM Timing WITH CAVEATS (2, 3)". This command requests all data entries from the "Timing" content table 220 which have caveats 2 and 3 (as identified in the "Caveat_ID" field) applied to the entries.

Referring to FIG. 2, circle 232 highlights the "Caveat_ID" fields for caveats "2" and "3". These records are indicated by bit 0 for caveat "2" and bit 1 for caveat "3" (shown by circle 230).

The JDBC API 140 may consult the Caveat table 220 to identify which bits identify an entry as having caveats 2 and 3 applied to it (as seen above, this would be bits 0 and 1). Next, the JDBC API 140 accesses Timing table 220 (as specified by value of "Timing" in field 212) in order to find all entries which have bits 0 and 1 flagged (that is, showing a value of 1) in the field named Caveats (as specified in the field 213). Circle 235 highlights the 0 and 1 bits in the "Caveats" field byte for "Timing_ID" entry 4. This indicates that "Timing_ID" entry 4 has (at least) caveats 2 and 3 applied to it and, thus, satisfies the query. As the other entries do not satisfy the query, JDBC API 140 may return a reference to "Timing_ID" entry 4 as a response to the query.

The above example is but one, non-limiting embodiment. In an alternative embodiment, caveats for each table are stored in a caveat table (having primary key columns and caveat columns and/or the caveat column is combined with primary key (PK) column such that 8 bits of the PK represent the caveats, as non-limiting examples). There can be one cavear table per content table, or a single caveat table for multiple content tables (with an extra column to reference the content table). The caveat column may use a data type that can contain more bits (such as a LONG VARCHAR FOR BIT DATA for example).

In another alternative embodiment, caveat definitions can be applied to more than one table. For example, the Caveat table may be replaced by two tables: a caveat definition table (such as a table having fields for ID, Date and Definition for example) and a relationship table (such as a table having fields for Caveat_Id, Table, Field and Bit for example).

Figure 3:
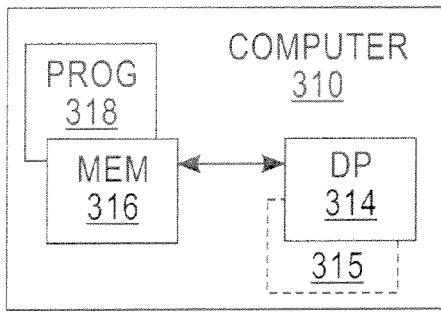
FIG. 3 shows a simplified block diagram of exemplary electronic devices that are suitable for use in practicing various exemplary embodiments.

Reference is made to FIG. 3 for illustrating a simplified block diagram of various electronic devices and apparatus that are suitable for use in practicing exemplary embodiments. For example, computer 310 may be used to control a lithography process in accordance with an exemplary embodiment.

The computer 310 includes a controller, such as a computer or a data processor (DP) 314 and a computer-readable memory medium embodied as a memory (MEM) 316 that stores a program of computer instructions (PROG) 318.

The PROGs 318 is assumed to include program instructions that, when executed by the associated DP 314, enable the device to operate in accordance with exemplary embodiments, as will be discussed below in greater detail.

That is, various exemplary embodiments may be implemented at least in part by computer software executable by the DP 314 of the computer 310, or by hardware, or by a combination of software and hardware (and firmware).

The computer 310 may also include dedicated processors, for example caveat storage manager processor 315.

The computer readable MEM 316 may be of any type suitable to the local technical environment and may be implemented using any suitable data storage technology, such as semiconductor based memory devices, flash memory, magnetic memory devices and systems, optical memory devices and systems, fixed memory and removable memory. The DP 314 may be of any type suitable to the local technical environment, and may include one or more of general purpose computers, special purpose computers, microprocessors, digital signal processors (DSPs) and processors based on a multicore processor architecture, as non-limiting examples.

The exemplary embodiments, as discussed herein and as particularly described with respect to exemplary methods, may be implemented in conjunction with a program storage device (such as at least one memory for example) readable by a machine, tangibly embodying a program of instructions (such as a program or computer program for example) executable by the machine for performing operations. The operations comprise steps of utilizing the exemplary embodiments or steps of the method.

The exemplary embodiments may be carried out by computer software implemented by the DP 314 or by hardware, or by a combination of hardware and software. As a non-limiting example, the exemplary embodiments may be implemented by one or more integrated circuits. The MEM 316 may be of any type appropriate to the technical environment and may be implemented using any appropriate data storage technology, such as optical memory devices, magnetic memory devices, semiconductor based memory devices, fixed memory and removable memory, as non-limiting examples. The DP 314 may be of any type appropriate to the technical environment, and may encompass one or more of microprocessors, general purpose computers, special purpose computers and processors based on a multi-core architecture, as non limiting examples.

Figure 4:
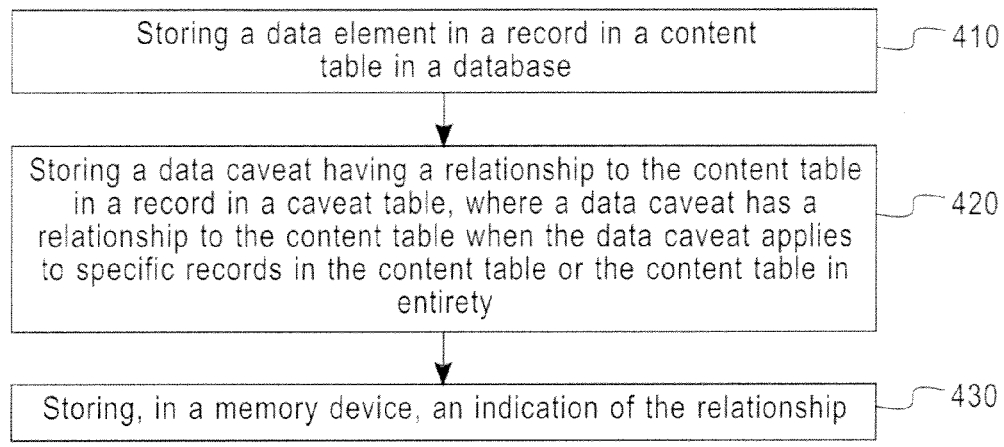
FIG. 4 is a logic flow diagram that illustrates the operation of a first exemplary embodiment, and a result of execution of computer program instructions embodied on a computer readable memory, in accordance with various exemplary embodiments.

FIG. 4 is a logic flow diagram that illustrates the operation of a method, and a result of execution of computer program instructions (such as PROG 318 for example), in accordance with exemplary embodiments. In accordance with these exemplary embodiments a method performs, at Block 410, a step of storing a data and optionally a field with bits to indicate applicability of caveats in a database table. At Block 420, the method performs a step of storing a data caveat having a relationship to one or more database tables in a record in a caveat table. A data caveat has a relationship to the database when the data caveat applies to either one or more records in one or more database tables or to one or more database tables in entirety. The method also performs a step of storing, in a memory device, an indication of the relationship at Block 430.

The various blocks shown in FIG. 4 may be viewed as method steps, and/or as actions that result from operation of computer program code, and/or as a plurality of coupled logic circuit elements constructed to carry out the associated function(s).

The blocks shown in FIG. 4 further may be considered to correspond to one or more functions and/or operations that are performed by one or more components, circuits, chips, apparatus, processors, computer programs and/or function blocks. Any and/or all of the above may be implemented in any practicable solution or arrangement that enables operation in accordance with the exemplary embodiments as described herein.

In addition, the arrangement of the blocks depicted in FIG. 4 should be considered merely exemplary and non-limiting. It should be appreciated that the blocks shown in FIG. 4 may correspond to one or more functions and/or operations that may be performed in any order (such as any suitable, practicable and/or feasible order for example) and/or concurrently (such as suitable, practicable and/or feasible for example) so as to implement one or more of the exemplary embodiments. In addition, one or more additional functions, operations and/or steps may be utilized in conjunction with those shown in FIG. 4 so as to implement one or more further exemplary embodiments.

That is, the exemplary embodiments shown in FIG. 4 may be utilized, implemented or practiced in conjunction with one or more further aspects in any combination (such as any combination that is suitable, practicable and/or feasible for example) and are not limited only to the steps, blocks, operations and/or functions shown in FIG. 4.

Below are further descriptions of various non-limiting, exemplary embodiments. The below-described exemplary embodiments are numbered separately for clarity purposes. This numbering should not be construed as entirely separating the various exemplary embodiments since aspects of one or more exemplary embodiments may be practiced in conjunction with one or more other aspects or exemplary embodiments.

The exemplary embodiments, as discussed herein and as particularly described with respect to exemplary methods, may be implemented in conjunction with a program storage device (such as at least one memory for example) readable by a machine, tangibly embodying a program of instructions (such as a program or computer program for example) executable by the machine for performing operations. The operations comprise steps of utilizing the exemplary embodiments or steps of the method.

Any use of the terms "connected", "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

An exemplary embodiment provides a method for storing data caveats for databases. The method includes storing (such as in a memory for example) at least one record in at least one content table. The method includes storing (such as in a memory for example) at least one data caveat having a relationship to a content table in at least one record in a caveat table. A data caveat has a relationship to a content table when the data caveat applies to: a record in the content table or to the content table in entirety. The method also includes storing (such as in a memory for example), in a memory device, an indication of the relationship.

In a further exemplary embodiment of the method above, the at least one data caveat applies to a content table. The indication of the relationship is embodied in the fields in the caveat table.

In another exemplary embodiment of any one of the methods above, the at least one data caveat applies to the at least one record in a content table or at least one table. The indication of the relationship is embodied in a field in the record in the data caveat table and if the relationship is to specific records in the content table in the at least one field in records of the content table(s). The field may include at least one bit and each of the at least one bit corresponds to a record in the caveat table.

In a further exemplary embodiment of any one of the methods above, storing the at least one data caveat includes adding a record to the caveat table. Storing the indication of the relationship to specific records in a content table includes changing at least one bit in a field in a record in the content table.

In another exemplary embodiment of any one of the methods above, each record in the caveat table includes a field indicating a content table associated with the data caveat in the record. A content table is associated with a data caveat when the data caveat has a relationship to the content table.

In a further exemplary embodiment of any one of the methods above, the method also includes receiving the at least one data caveat with the at least one data record.

In another exemplary embodiment of any one of the methods above, the method also includes receiving the at least one data record at a first time and receiving the at least one data caveat at a second subsequent time, In a further exemplary embodiment of any one of the methods above, the method also includes receiving a query; and responding to the query based at least in part on the caveat table(s) and the content table(s). The query may be a structured query language (SQL) query.

Another exemplary embodiment provides an article of manufacture for storing data caveats for databases. The article of manufacture is tangibly embodying computer readable non-transitory instructions which, when implemented, cause a computer to carry out the steps of a method. The method includes storing at least one data element in at least one entry in a database. The method includes storing at least one data caveat having a relationship to the database in at least one record in a caveat table. A data caveat has a relationship to the database when the data caveat applies to: a record in the content table or the content table itself. The method also includes storing, in a memory device, an indication of the relationship.

In a further exemplary embodiment of the article of manufacture above, the at least one data caveat applies to at least one content table. The indication of the relationship is embodied in a field in the caveat table.

In another exemplary embodiment of any one of the articles of manufacture above, the at least one data caveat applies to the at least one content table. The indication of the relationship to one or more specific records in a content table is embodied in a field in the at least one entry in the content table. The field may include at least one bit and each of the at least one bit corresponds to a record in the caveat table.

In a further exemplary embodiment of any one of the articles of manufacture above, storing the at least one data caveat includes adding a record to the caveat table. Storing the indication of the relationship to specific records in a content table includes changing at least one bit in a field in an entry in the content table.

In another exemplary embodiment of any one of the articles of manufacture above, each record in the caveat table includes a field indicating a database associated with the data caveat in the record. A content table is associated with a data caveat when the data caveat has a relationship to the content table.

In a further exemplary embodiment of any one of the articles of manufacture above, the method also includes receiving the at least one data caveat with the at least one data record.

In another exemplary embodiment of any one of the articles of manufacture above, the method also includes receiving the at least one data record at a first time; and receiving the at least one data caveat at a second subsequent time.

In a further exemplary embodiment of any one of the articles of manufacture above, the method also includes receiving a query; and responding to the query based at least in part on the caveat table(s) and the content table(s). The query may be a structured query language query.

Generally, various exemplary embodiments can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated for carrying out various exemplary embodiments. However, various modifications and adaptations may become apparent to those skilled in the relevant arts in view of the foregoing description, when read in conjunction with the accompanying drawings and the appended claims. However, all such and similar modifications will still fall within the scope of the teachings of the exemplary embodiments.

Furthermore, some of the features of the preferred embodiments could be used to advantage without the corresponding use of other features. As such, the foregoing description should be considered as merely illustrative of the principles, and not in limitation thereof.

The following abbreviations that may be found in the specification and/or the drawing figures are defined as follows:

API application programming interface
DB database
JDBC Java database connectivity
SQL structured query language

What is claimed is:

1. A method executed by at least one computer, comprising:
storing at least one record in at least one content table in a database, the at least one record comprising content data;
storing at least one data caveat in at least one record in a caveat table, the at least one data caveat having a relationship to the at least one record in the at least one content table, wherein the at least one data caveat has a relationship to the at least one content table, wherein the at least one data caveat applies to at least one of: a record in the at least one content table or the content table in its entirety or at least one record stored in a plurality of content tables; and
storing, in a memory device, an indication of the relationship;
wherein the at least one data caveat is pointed to by an indicator stored in a field of the at least one record in the at least one content table, wherein the at least one data caveat comprises information, that is expressive to a user of the content data, at least of how the content data stored in the at least one record of the at least one content table was obtained, and wherein each record in the caveat table comprises a field indicating at least one content table associated with the data caveat in the record.

2. The method of claim 1, wherein the at least one data caveat applies to the at least one content table, and wherein the indication of the relationship is embodied in a field in the caveat table.

3. The method of claim 1, wherein the at least one data caveat applies to the at least one record in the at least one content table or the at least one content table itself, and wherein the indication of the relationship to specific records in the at least one content table is embodied in the field in the at least one content table.

4. The method of claim 3, wherein the field comprises at least one bit and each of the at least one bit corresponds to a record in the caveat table.

5. The method of claim 1, wherein storing the at least one data caveat comprises adding a record to the caveat table; and wherein storing the indication of the relationship to specific records in the at least one content table comprises changing at least one bit in the field in the records in the at least one content table.

6. The method of claim 1, wherein a particular one of at least one content table is associated with a data caveat when the data caveat has a relationship to the database.

7. The method of claim 1, wherein the method further comprises receiving the at least one data caveat with the at least one record from the at least one content table.

8. The method of claim 1, wherein the method further comprises:
receiving the at least one record from a particular content table at a first time; and
receiving the at least one data caveat at a second subsequent time.

9. The method of claim 1, wherein the method further comprises:
receiving a query; and
responding to the query based at least in part on the caveat table and the at least one content table.

10. The method of claim 9, wherein the query is a structured query language query.

11. The method of claim 1, wherein the at least one data caveat comprises information that is expressive to a user of the content data of at least one of a warning or a qualification concerning the content data.

12. The method of claim 1, wherein the at least one data caveat comprises information that is expressive to a user of the content data of at least one of a warning or a qualification concerning use of the content data.

13. The method of claim 1, wherein the at least one data caveat comprises information that is expressive to a user of the content data of a procedure that was used for collecting the content data.

14. The method of claim 1, wherein the at least one data caveat comprises information that is expressive to a user of the content data of a change, over a data collection period, in a procedure that was used for collecting the content data.

15. The method of claim 1, wherein the at least one data caveat comprises information that is expressive to a user of the content data of a constraint that existed in a procedure that was used for collecting the content data.

16. The method of claim 1, wherein the at least one data caveat comprises information that is expressive to a user of the content data of which data was included or excluded from the content data.

\* \* \* \* \*